United States Patent
Lusk

(10) Patent No.: US 10,133,566 B2
(45) Date of Patent: Nov. 20, 2018

(54) SOFTWARE UPGRADING SYSTEM AND METHOD IN A DISTRIBUTED MULTI-NODE NETWORK ENVIRONMENT

(71) Applicant: Adtran, Inc., Huntsville, AL (US)

(72) Inventor: Diron Lusk, McKinney, TX (US)

(73) Assignee: Adtran, Inc., Huntsville, AL (US)

( * ) Notice: Subject to any disclaimer, the term of this patent is extended or adjusted under 35 U.S.C. 154(b) by 0 days.

(21) Appl. No.: 15/474,170

(22) Filed: Mar. 30, 2017

(65) Prior Publication Data
US 2018/0285087 A1     Oct. 4, 2018

(51) Int. Cl.
| | |
|---|---|
| G06F 9/44 | (2018.01) |
| G06F 8/65 | (2018.01) |
| H04L 12/24 | (2006.01) |
| H04L 29/08 | (2006.01) |

(52) U.S. Cl.
CPC ............... *G06F 8/65* (2013.01); *H04L 41/06* (2013.01); *H04L 41/20* (2013.01); *H04L 67/34* (2013.01)

(58) Field of Classification Search
CPC ........................................................ G06F 8/65
USPC .................................. 717/168–177; 709/203
See application file for complete search history.

(56) References Cited

U.S. PATENT DOCUMENTS

| | | | | |
|---|---|---|---|---|
| 5,867,714 A * | 2/1999 | Todd | .......... | G06F 8/64 707/999.01 |
| 6,006,034 A * | 12/1999 | Heath | .......... | G06F 8/65 717/170 |
| 6,070,012 A * | 5/2000 | Eitner | .......... | G06F 8/656 717/168 |
| 6,532,543 B1 * | 3/2003 | Smith | .......... | G06F 8/65 370/517 |
| 7,178,144 B2 * | 2/2007 | Melchione | .......... | G06F 8/61 709/221 |
| 7,463,610 B2 * | 12/2008 | Collins | .......... | G06F 8/65 370/338 |

(Continued)

FOREIGN PATENT DOCUMENTS

| | | |
|---|---|---|
| WO | 2009014319 A1 | 1/2009 |
| WO | 2016095537 A1 | 6/2016 |
| WO | 2017161361 A2 | 9/2017 |

OTHER PUBLICATIONS

De et al, "Deployment-Aware Modeling of Node Compromise Spread in Wireless Sensor Networks Using Epidemic Theory", ACM Transactions on Sensor Networks, vol. 5, No. 3, Article 23, pp. 1-33, 2009.*

(Continued)

*Primary Examiner* — Anil Khatri
(74) *Attorney, Agent, or Firm* — Smith Tempel Blaha LLC; Michael J. Tempel

(57) ABSTRACT

A software upgrade in a data communication network may be provided by a first node. The first node may transfer a software unit to other nodes in the network. The first node may also monitor for receipt of a notification indicating completion of storage of the software unit by a node. The first node may further transmit a reboot command to the other nodes. The first node transmits the reboot command in response to receipt of the completion notification from each of the other nodes. The first node does not transmit the reboot command to any of the other nodes until the first node has received a completion notification from each of the other nodes.

15 Claims, 5 Drawing Sheets

(56) References Cited

U.S. PATENT DOCUMENTS

| | | | | |
|---|---|---|---|---|
| 7,571,154 B2* | 8/2009 | Emeis | ............... | G06F 9/5044 |
| 7,603,669 B2* | 10/2009 | Curtis | ............... | G06F 8/65 |
| | | | | 707/999.202 |
| 8,064,391 B2* | 11/2011 | Kozisek | ............... | H04L 41/0823 |
| | | | | 370/219 |
| 8,117,328 B2* | 2/2012 | Choi | ............... | H04L 29/06 |
| | | | | 709/219 |
| 8,275,827 B2* | 9/2012 | Hubbard | ............... | G06F 9/5044 |
| | | | | 709/201 |
| 8,301,759 B2* | 10/2012 | Pietrek | ............... | G06F 11/3476 |
| | | | | 709/202 |
| 8,621,054 B2* | 12/2013 | Maruyama | ............... | G06F 8/65 |
| | | | | 709/223 |
| 8,856,222 B2* | 10/2014 | McCanne | ............... | H03M 7/30 |
| | | | | 709/203 |
| 8,943,490 B1* | 1/2015 | Jain | ............... | H04Q 3/54516 |
| | | | | 717/168 |
| 9,003,387 B2* | 4/2015 | Van Camp | ............... | G06F 8/65 |
| | | | | 717/170 |
| 9,021,459 B1* | 4/2015 | Qu | ............... | G06F 8/65 |
| | | | | 710/33 |

OTHER PUBLICATIONS

Otte et al, "Predictable Deployment in Component-based Enterprise Distributed Real-time and Embedded Systems" ACM, pp. 21-30, 2011.*

Xu et al, "A Speed-based Adaptive Dynamic Parallel Downloading Technique", ACM SIGOPS Operating Systems Review: vol. 39 Issue 1, pp. 63-69, 2005 (Year: 2005).*

Hudson et al, "Supporting Dynamic Downloadable Appearances in an—Extensible User Interface Toolkit", ACM, pp. 159-168, 1997 (Year: 1997).*

Hassan et al, "Demonstrating Practical Provably Secure Multi-node Communication", ACM, pp. 85-86, 2012 (Year: 2012).*

Gera et al, "Trust Based Multi-Path Routing for End to End Secure Data Delivery in MANETs", ACM, pp. 81-89, 2010 (Year: 2010).*

Extended European Search Report, dated Jul. 2, 2018 (dated Jul. 2, 2018).

* cited by examiner

SOFTWARE UPGRADING SYSTEM AND METHOD IN A DISTRIBUTED MULTI-NODE NETWORK ENVIRONMENT

BACKGROUND

In a data communication network, devices known as nodes are interconnected with each other over data links, such as wires, optical fibers, or radio links. A node may serve as the origin of a communication, the destination of a communication, or as a router of a communication between two other nodes. In routing a communication, a first node in a chain of three nodes may receive a communication from a second node and forward the communication to a third node. A ring is a common data communication network topology. In a ring network, each node is connected to exactly two other nodes. To avoid the potentially adverse effects of a loop in a ring network, a loop-avoidance feature such as Ethernet Ring Protection Switching (ERPS) may be employed. Such a loop-avoidance feature prevents traffic from flowing on one link in the ring at any given time. A ring network having a loop-avoidance feature is thus similar to a linear network, in which three or more nodes form a chain. Various other network topologies, such as tree networks, may similarly include chains of three or more nodes.

A node is essentially a type of specialized computing device. Accordingly, a node includes a processing system that operates under the control of software or firmware. From time to time, personnel charged with operating or maintaining the network may deem it necessary to modify or upgrade the firmware stored in the nodes. To initiate a firmware upgrade, such personnel may cause one of the nodes, which is configured with a management system, to download the firmware to the other nodes. Although from a logical perspective the firmware downloads to all such other nodes simultaneously, from a physical perspective the firmware (in the form of frames, data packets, etc.) propagates from node to node down the chain (i.e., in a "downstream" direction). Each node in the chain receives and stores the firmware in memory, then reboots itself. The amount of time required for a node to receive and store the firmware may depend upon a number of factors that may differ among the nodes. Thus, one node may take longer to receive and store the firmware than another node. For example, a node farther downstream may take longer to completely receive the firmware than a node farther upstream. Also, a node having more elements (e.g., circuit cards) that need to be configured with corresponding copies of the firmware may take longer to completely store the firmware than a node having fewer such elements.

While a node is in the process of rebooting, it is off-line with respect to the network, and nodes downstream from the rebooting node may be interrupted from completing receiving and storing the firmware. Also, not only the network traffic related to the firmware upgrade but also other network traffic may be interrupted while a node is in the process of rebooting. Once the node finishes rebooting, i.e., is back on-line in the network, nodes that were interrupted may or may not properly complete receiving and storing the firmware, depending on factors that are often difficult to predict.

SUMMARY

Embodiments of the invention relate to providing a software upgrade to nodes of a data communication network. The embodiments may include exemplary methods, systems, and computer program products.

An exemplary method for providing a network software upgrade may include a first node transferring a software unit to a plurality of other nodes in the data communication network, monitoring for receipt of a notification indicating completion of storage of the software unit by another node, and transmitting a reboot command to the plurality of other nodes. The reboot command is transmitted in response to receipt of the completion notification from each of the other nodes. The reboot command is not transmitted to any of the other nodes until a completion notification has been received from each of the other nodes.

An exemplary system for providing a network software upgrade may include a network interface and a processing system. The network interface is configured to communicate data with a plurality of other nodes in a data communication network. The processing system, which includes a processor and a memory, may be configured to monitor for receipt of a notification indicating completion of storage of the software unit by another node, and transmit a reboot command to the plurality of other nodes. The reboot command is transmitted in response to receipt of the completion notification from each of the other nodes. The reboot command is not transmitted to any of the other nodes until a completion notification has been received from each of the other nodes.

A computer program product for providing a network software upgrade may include a non-transitory computer-readable medium on which are stored computer-executable instructions. Execution of the instructions by a processing system of a node of a data communication network having a plurality of other nodes may configure the node to monitor for receipt of a notification indicating completion of storage of the software unit by another node, and to transmit a reboot command to the plurality of other nodes. The reboot command is transmitted in response to receipt of the completion notification from each of the other nodes. The reboot command is not transmitted to any of the other nodes until a completion notification has been received from each of the other nodes.

Other systems, methods, features, and advantages will be or become apparent to one with skill in the art upon examination of the following figures and detailed description. It is intended that all such additional systems, methods, features, and advantages be included within this description, be within the scope of the specification, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 1:
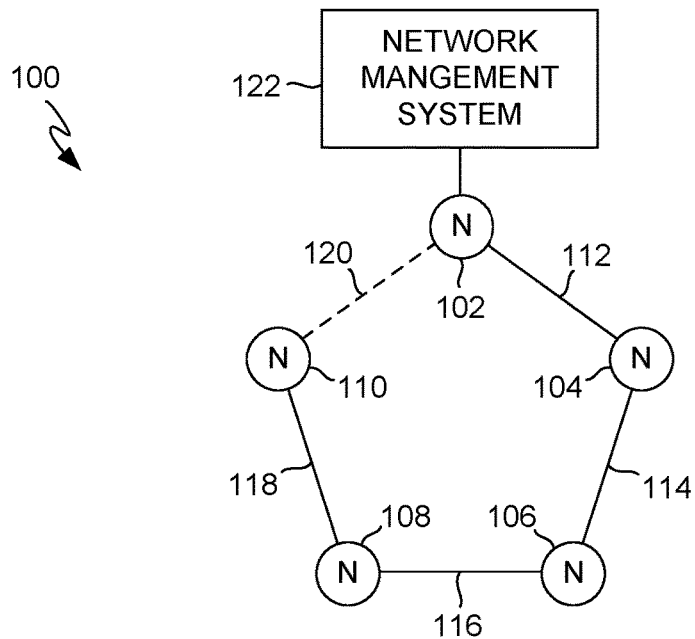
FIG. 1 illustrates an exemplary ring network, in accordance with an exemplary embodiment of the invention.

As illustrated in FIG. 1, in an illustrative or exemplary embodiment of the invention, a data communication network 100 includes nodes 102, 104, 106, 108, and 110 interconnected in a ring topology. Although in this exemplary embodiment there are five nodes 102-110, in similar embodiments there can be any number of three or more such nodes interconnected in a ring topology. Also, such a network having a ring topology can be part of a larger network (not shown), which may comprise any topology or combination of topologies. The exemplary data communication network 100 may conform to one or more data communication protocols, such as Ethernet, Digital Subscriber Line (DSL), Gigabit Passive Optical Network (GPON), etc. Nodes 102-110 are interconnected by communication links 112, 114, 116, 118, and 120. That is, each of nodes 102-110 is coupled via one or more communication links 112-120 and zero or more intervening ones of nodes 102-110 to all other ones of nodes 102-110. More specifically: node 102 is directly connected to node 104 by communication link 112; node 104 is directly connected to node 106 by communication link 114; node 106 is directly connected to node 108 by communication link 116; node 108 is directly connected to node 110 by communication link 118; and node 110 is directly connected to node 102 by communication link 120. In accordance with a ring-protection protocol such as Ethernet Ring Protection Switching (ERPS), one of communication links 112-120, such as communication link 120, may be prevented from carrying traffic (as indicated in broken line). Communication links 112-120 may include any physical data communication media, such as coaxial cable, optical fiber, etc. Although not shown in FIG. 1 for purposes of clarity, such physical data communication media may terminate at physical ports of nodes 102-110. As the exemplary data communication network 100 may be part of a larger network (not shown), some or all of nodes 102-110 may more than two physical ports.

Data communication network 100 may be a wide-area network (WAN), in which nodes 102-110 are dispersed over a wide geographic area. For example, data communication network 100 may be a broadband services network through which a service provider delivers voice (telephony), Internet access, television content, etc., to subscribers. Nevertheless, in other embodiments such a data communication network may be a local-area network (LAN), in which such nodes are located within a relatively small area, such as a building, campus, neighborhood, etc. Although not shown for purpose of clarity, additional communication links between nodes 102-110 and subscriber devices (or networks of subscriber devices) may enable subscriber devices to access data communication network 100.

At least one of nodes 102-110, such as node 102, may be configured with a network management system 122. Configured with network management system 122 and related features, node 102 may serve as a central office terminal (COT) or be part of a COT. Although not shown for purposes of clarity, node 102, serving as a COT, may also be connected through respective communication links to the Internet, a voice telephony system, a television content distribution system, or other systems commonly associated with broadband services networks. Although network management system 122 is conceptually depicted in FIG. 1 for purposes of clarity as external to node 102, network management system 122 may be internal to node 102, or partly internal and partly external to node 102. For example, node 102 may be connected to a remote operator terminal by a communication link. Through a user interface (not shown), a person (operator) may use network management system 122 to initiate the software upgrade method described below.

Except as may be specifically described herein, some or all of nodes 102-110 may be configured similarly to each other. Some or all of nodes 102-110 may be configured differently from each other in respects that are not relevant to the methods described herein. Although not described herein for purposes of clarity, nodes 102-110 are configured to communicate user data, also referred to as traffic, within data communication network 100 in a conventional manner Thus, for example, some or all of nodes 102-110 are configured to forward traffic from a neighboring node to another neighboring node. As understood by one of ordinary skill in the art, the traffic or other communications, messages, notifications, commands, etc., may comprise any data units of the types commonly employed in data communication networks, such as packets, frames, etc.

The terms "upstream" and "downstream" may be used to refer to relative directions or locations in data communication network 100. "Downstream" may refer to a direction away from node 102 along a path through data communication network 100, while "upstream" may refer to a direction toward node 102 along a path through data communication network 100. A location in data communication network 100 that is "downstream" from another location in data communication network 100 is farther away from node 102, while a location in data communication network 100 that is "upstream" from another location in data communication network 100 is closer to node 102.

Figure 2:
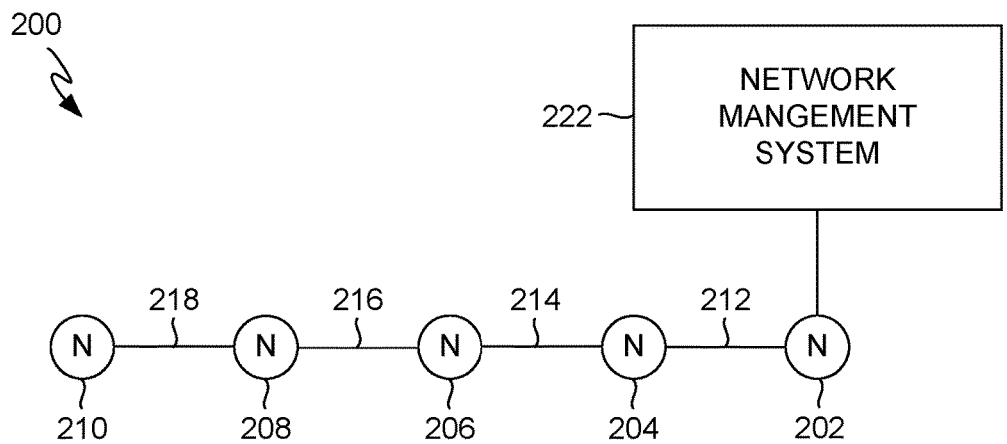
FIG. 2 illustrates an exemplary linear network, in accordance with an exemplary embodiment of the invention.

As illustrated in FIG. 2, in another illustrative or exemplary embodiment of the invention, a data communication network 200 includes nodes 202, 204, 206, 208, and 210 interconnected in a linear topology. Nodes 202-210 are interconnected by communication links 212, 214, 216, and 218. That is, each of nodes 202-210 is coupled via one or more communication links 212-218 and zero or more intervening ones of nodes 202-210 to all other ones of nodes 202-210. More specifically: node 202 is directly connected to node 204 by communication link 212; node 204 is directly connected to node 206 by communication link 214; node 206 is directly connected to node 208 by communication link 216; and node 208 is directly connected to node 210 by communication link 218. Although in this exemplary embodiment there are five nodes 202-210, in similar embodiments there can be any number of three or more such nodes interconnected in a linear topology. Also note that such a network having a linear topology may be part of a larger network, which may comprise any topology or combination of topologies. For example, still another exemplary network (not shown) could comprise a combination of ring, linear, and tree topologies. At least one of nodes 202-210, such as node 202, may be configured with a network management system 222 similar to above-described network management system 122. Data communication network 200 and its nodes 202-210 may be similar in the respects described above to data communication network 100 (FIG. 1) and its nodes 102-110.

Figure 3A:
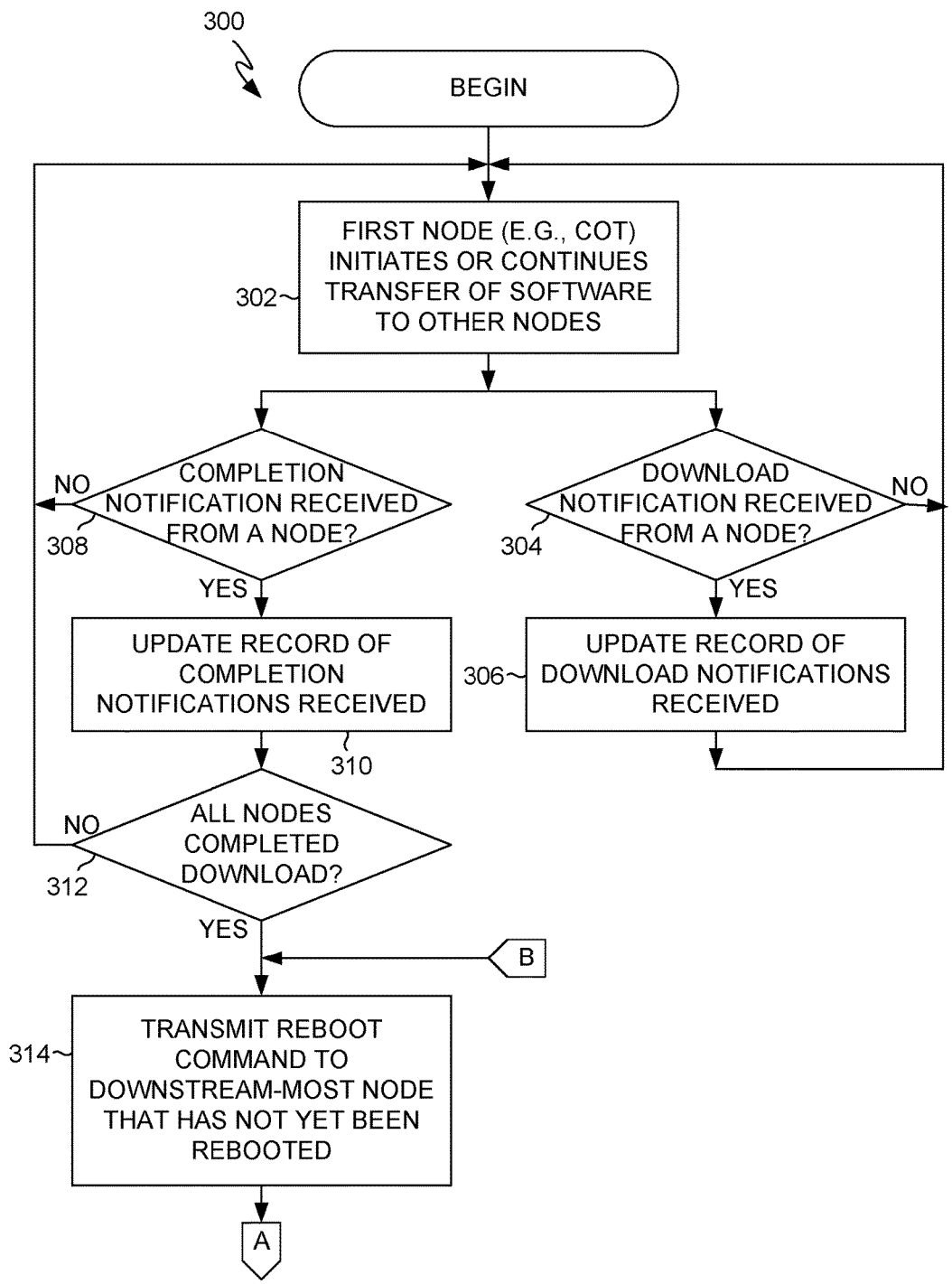
FIG. 3A is a flow diagram illustrating an exemplary method relating to providing a software upgrade in a data communication network, in accordance with an exemplary embodiment of the invention.
Figure 3B:
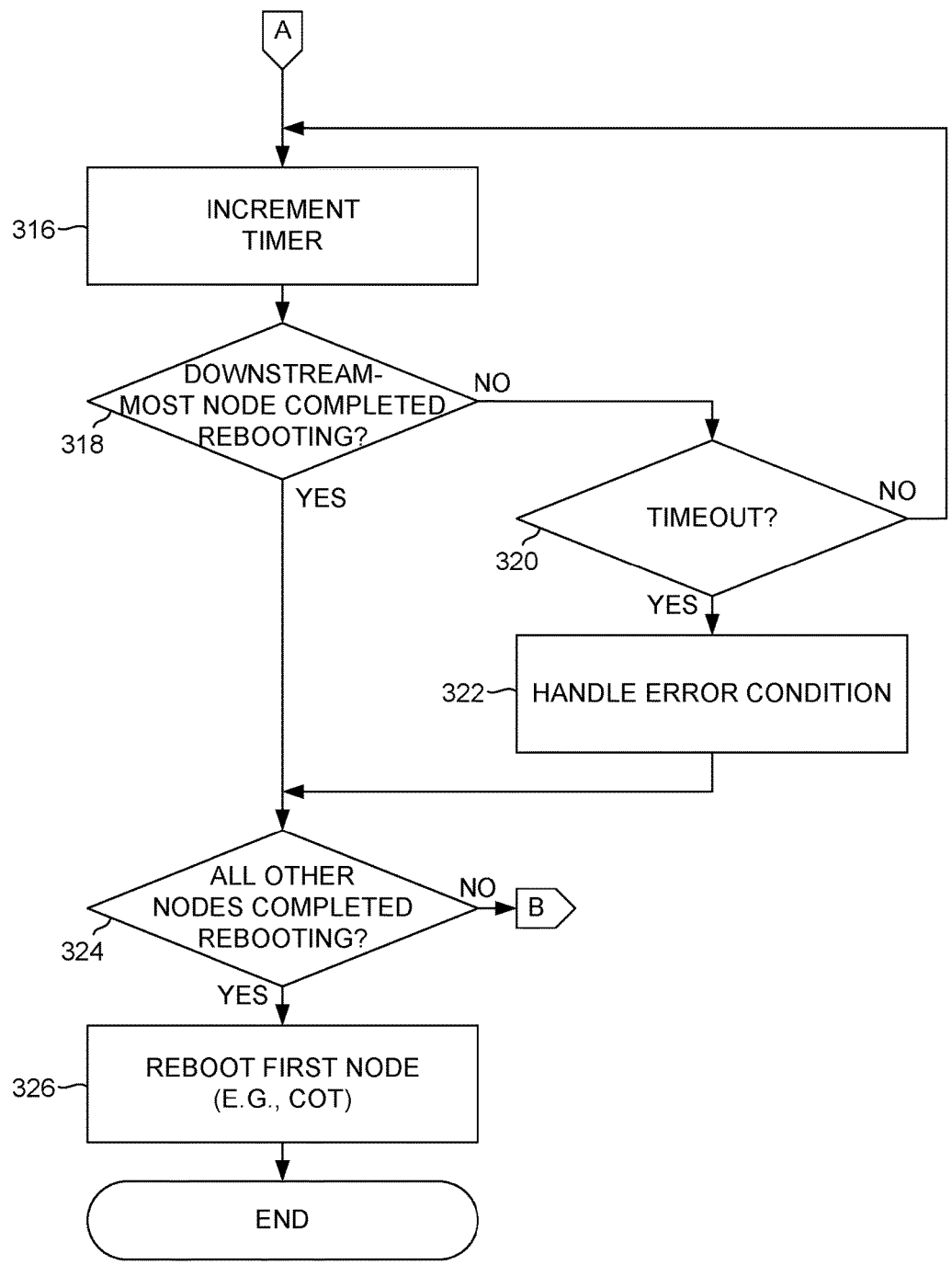
FIG. 3B is a continuation of the flow diagram of FIG. 3A.

As illustrated in FIGS. 3A-3B, an exemplary method 300 for providing a network software upgrade may be controlled by a device such as, for example, above-described node 102 (FIG. 1) or node 202 (FIG. 2). In the following descriptions of exemplary methods, although certain acts or steps described below naturally precede others for the exemplary embodiments to operate as described, the invention is not limited to the order of those acts or steps if such order or sequence does not alter the functionality of the invention. That is, it is recognized that some acts or steps may be performed before, after, or in parallel (i.e., substantially simultaneously) with other acts or steps without departing from the scope and spirit of the invention. In some instances, certain acts or steps may be omitted or not performed, without departing from the scope and spirit of the invention. Also, the exemplary methods described below are not intended to describe the operation of any device or system in its entirety; rather, a device or system may include additional functionality, such as conventional functionality, as understood by one of ordinary skill in the art. Further, words such as "then," "next," etc., are not intended to limit the order of the acts or steps. Rather, such words are used as aids in guiding the reader through the descriptions of the exemplary methods.

Although not shown for purposes of clarity, node 102 initially may be provided with the upgrade software from an external source, under control of an operator. For example, the operator may facilitate the transfer of software to node 102 from an external source, such as the manufacturer of nodes 102-110 or an entity charged with maintaining data communication network 100 or its nodes 102-110. The software may serve as an upgrade, i.e., to replace, modify, supplement, etc., software stored in nodes 102-110. The upgrade software may comprise one or more files or similar units in which software upgrades are commonly provided, as understood by one of ordinary skill in the art. The upgrade software also may be referred to herein as a "software unit" to emphasize that it defines a cohesive package or group of one or more files or similar sub-units that affects an aspect of the operation of nodes 102-110. In this context, the "operation" of nodes 102-110 refers to functions that characterize them as network nodes as opposed to some other type of electronic device.

The term "software" as used herein in the context of the upgrade software refers to data that affect the operation of the nodes 102-110. The software may include processor-executable software as well as non-executable software, such as data files. As each of nodes 102-110 is essentially a type of specialized computing device, each of nodes 102-110 operates under the control of software. As used herein, the term "software" includes firmware within its scope of meaning.

In the exemplary method 300, a transfer of the upgrade software from node 102 to the other nodes 104, 106, 108, and 110 of the exemplary data communication system 100 is initiated, as indicated by block 302. For example, an operator may initiate the transfer by using a user interface (not shown) associated with network management system 122. Alternatively, the transfer may be initiated in response to a triggering event, such as at a predetermined time. The other nodes 104-110 then begin receiving the upgrade software from node 102 via communication links 112-118. Conceptually, all of nodes 104-110 begin receiving the upgrade software simultaneously. Nevertheless, it should be appreciated that the software physically propagates (in conventional units of packets, frames, etc.) in a downstream direction, from communication link 112 to communication link 114, to communication link 116, to communication link 118. Note that in this example, the ring-protection technology prevents traffic on communication link 120. Nevertheless, in another example, the ring-protection technology could prevent traffic on communication link 112, and the software could propagate from communication link 120 to communication link 118, to communication link 116, to communication link 114.

Nodes 104, 106, 108, and 110 store portions of the upgrade software in memory (not shown in FIG. 1) as such portions are received. Node 102 may similarly store the upgrade software so that node 102 may be upgraded as well. Each of nodes 104-110 may transmit a download notification to node 102 indicating that it has begun receiving the upgrade software. As indicated by block 304, node 102 may monitor for this download notification. If node 102 detects (block 304) that it has received such a download notification from one of nodes 104-110, node 102 updates a list or other record accordingly, as indicated by block 306, so that node 102 may keep track of from which of nodes 104-110 it has received download notifications. Although not shown for purposes of clarity, node 102 may use such a list to take corrective action or otherwise handle the error condition in the event any of nodes 104-110 fails to begin receiving the upgrade software. As node 102 continues to monitor for such download notifications, the transfer of the upgrade software may continue, as indicated in FIG. 3A by the return of the method flow to block 302.

It should be appreciated that, due to a number of factors, different ones of nodes 104-110 may take different amounts of time to completely receive and store the upgrade software. For example, those of nodes 104-110 farther downstream from other nodes 104-110 may take longer to completely receive the upgrade software than those of nodes 104-110 farther upstream. Also, those of nodes 104-110 having more elements (e.g., circuit cards) that need to be configured with corresponding copies of the software upgrade than other nodes 104-110 may take longer to completely store the upgrade software.

Each of nodes 104-110 may transmit a download notification to node 102 indicating that it has completed receiving the upgrade software. As indicated by block 308, node 102 may monitor for this completion notification. If node 102 detects (block 308) that it has received such a completion notification from one of nodes 104-110, node 102 updates a list or other record accordingly, as indicated by block 310, so that node 102 may keep track of from which of nodes 104-110 it has received completion notifications. Although not shown for purposes of clarity, node 102 may use such a list to take corrective action or otherwise handle the error condition in the event any of nodes 104-110 fails to complete receiving the upgrade software (e.g., within a predetermined amount of time). As node 102 continues to monitor for such completion notifications, the transfer of the upgrade software may continue (block 302). As indicated by block 312, node 102 determines whether it has received completion notifications from all of the other nodes 104-110. The transfer of the upgrade software may continue (as indicated by the return of the method flow to block 302) until such time as node 102 determines (block 312) that it has received completion notifications from all of the other nodes 104-110, or until such time as node 102 determines that an error has occurred.

If node 102 determines (block 312) that it has received a completion notification from all of nodes 104-110, then node 102 transmits a reboot command to nodes 104-110. Thus, node 102 defers transmitting a reboot command to any of the other nodes 104-110 until node 102 has received the completion notification from each of the other nodes 104-110. Node 102 may transmit a reboot command to nodes 104-110 in a downstream-to-upstream order. That is, as indicated by block 314, node 102 may transmit a reboot command to the downstream-most one of nodes 104-110 to which node 102 has not yet transmitted a reboot command Node 102 may transmit a reboot command to the downstream-most node 110 of data communication network 100 before transmitting a reboot command to any of the more upstream nodes 104-108. As indicated by block 316 (FIG. 3B), node 102 may increment a timer that is used in determining whether a timeout (error condition) has occurred in rebooting. Similar timers and timeout determinations may be employed in association with identifying errors in the download process described above. As indicated by block 318, node 102 determines whether the one of nodes 104-110 to which node 102 transmitted a reboot command in accordance with block 314 has completed rebooting. In its capacity as the COT or as part of the COT, node 102 has the capability of determining which of nodes 104-110 are on-line and which of nodes 104-110 are off-line. By determining that one of nodes 104-110 to which node 102 has transmitted a reboot command subsequently went off-line (i.e., disconnected from data communication network 100) and then returned on-line (i.e., re-connected to data communication network 100), node 102 may determine that that node has completed rebooting.

As indicated by block 318, node 102 determines whether the one of nodes 104-110 to which node 102 has most recently transmitted a reboot command has completed rebooting. If node 102 determines (block 318) that that one of nodes 104-110 has not completed rebooting, then node 102 determines whether a timeout has occurred by comparing the current value of the timer (described above with regard to block 316) with a threshold, as indicated by block 320. If node 102 determines (block 320) that a timeout has not occurred, i.e., the current value of the timer has not reached the threshold, then node 102 continues to defer transmitting any further reboot command. If node 102 determines (block 320) that a timeout has occurred, i.e., the current value of the timer has reached the threshold before the above-referenced one of nodes 104-110 has completed rebooting, then node 102 may handle that error condition, as indicated by block 322. For example, node 102 may alert the operator of the error condition through the user interface of network management system 122.

If node 102 determines (block 318) that the one of nodes 104-110 to which node 102 has most recently transmitted a reboot command has completed rebooting (and no timeout has occurred), then node 102 may determine whether all other nodes 104-110 have completed rebooting, as indicated by block 324. If node 102 determines (block 324) that all other nodes 104-110 have not completed rebooting, then node 102 transmits a reboot command to the downstream-most one of nodes 104-110 to which node 102 has not yet transmitted a reboot command, as described above with regard to block 314. The method flow thus returns to block 314. For example, after node 102 determines that node 110 has completed rebooting, node 102 may transmit a reboot command to node 108. The process then continues as described above with regard to block 314. Then, after node 102 determines that node 108 has completed rebooting, node 102 may transmit a reboot command to node 106. After node 102 determines that node 106 has completed rebooting, node 102 may transmit a reboot command to node 104. In this manner, node 102 defers transmitting a reboot command to a further one of nodes 104-110 until the one of nodes 104-110 to which node 102 previously transmitted a reboot command and all other nodes 104-110 downstream thereof have completed rebooting. As indicated by block 326, node 102 may reboot itself after all other nodes 104-110 have completed rebooting. Although the foregoing method 300 is described above with regard to an example in which a software upgrade is provided in data communication network 100 (FIG. 1), the same method 300 applies to providing a software upgrade in data communication network 200 (FIG. 2) or other data communication network.

Figure 4:
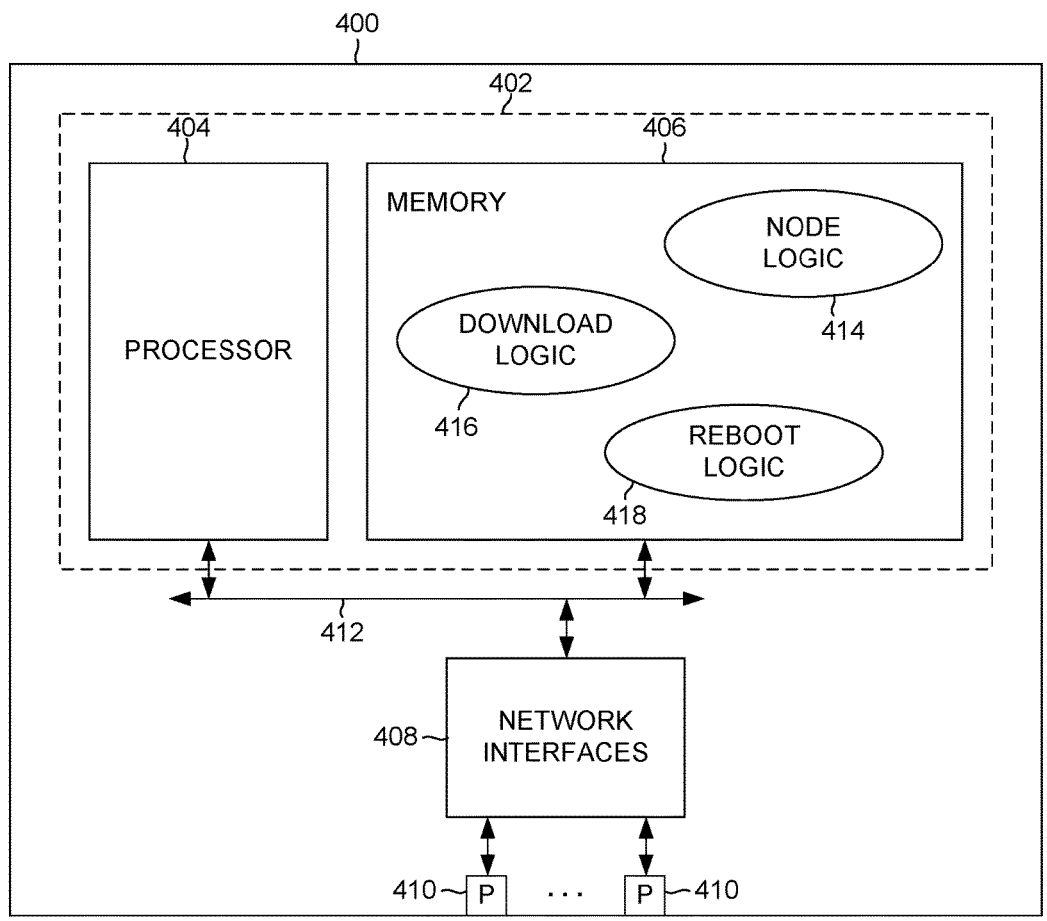
FIG. 4 is a block diagram illustrating a system for providing a software upgrade in a data communication network, in accordance with an exemplary embodiment of the invention.

As illustrated in FIG. 4, a node 400 may be an example of above-described node 102 (FIG. 1) or 202 (FIG. 2). Node 400 may include a processing system 402 comprising a processor 404 and a memory 406. Node 400 may further include network interfaces 408. Network interfaces 408 include the physical protocol-layer interfaces that communicate data through physical ports (P) 410. Although not shown for purposes of clarity, node 400 may include additional elements of the types commonly included in conventional network nodes. Processor 404, memory 406, network interfaces 408, and other elements (not shown) of node 400 may communicate signals with each other via one or more interconnects 412, such as buses. In accordance with conventional computing principles, processor 404 operates under the control of software or firmware, which configures processing system 402 to control various functions or methods, including the methods described herein. Such methods may also include conventional methods that characterize the operation of conventional network nodes or are otherwise associated with conventional network nodes.

Node 400 is configured with processing logic that may include node logic 414, download logic 416, and reboot logic 418. Although node logic 414, download logic 416, and reboot logic 418 are shown in FIG. 4 in a conceptual manner as stored in or residing in memory 406, one of ordinary skill in the art understands that such logic elements arise through the operation of processor 404 in accordance with conventional computing device principles. That is, software or firmware contributes to programming or configuring processing system 402 to be characterized by such logic elements.

Although memory 406 is depicted in FIG. 4 as a single or unitary element for purposes of clarity, memory 406 can be of any suitable type and can have any suitable structure, such as one or more modules, chips, etc. Memory 406 can be of a non-volatile type, such as flash memory. Likewise, although processor 404 is depicted in FIG. 4 as a single or unitary element for purposes of clarity, processor 404 can be of any suitable type and can have any suitable structure, such as one or more modules, chips, etc. For example, processor 404 can comprise one or more microprocessors or microcontrollers. Some or all of the foregoing processing system elements can be provided in, for example, an application-specific integrated circuit (ASIC) or other integrated digital device. It should be understood that the combination of memory 406 and the above-referenced logic elements or software, firmware, instructions, etc., underlying the logic elements, as stored in memory 406 in non-transitory computer-readable form, defines a "computer program product" as that term is understood in the patent lexicon. In view of the descriptions herein, persons skilled in the art will readily be capable of providing suitable software or firmware or otherwise configuring node 400 to operate in the manner described.

Node logic 414 may contribute to conventional methods or functions that characterize the operation of node 400 in a network, such as transmitting, receiving, and forwarding network traffic, applying various networking protocols, etc., as understood by one of ordinary skill in the art. Download logic 416 may contribute to the functions described above with regard to, for example, blocks 302-312 (FIG. 3A). Also, processing system 402, as configured with download logic 416, may serve as a means for performing such functions. Reboot logic 418 may contribute to the functions described above with regard to, for example, blocks 314-326 (FIGS. 3A-3B). Also, processing system 402, as configured with download logic 416, may serve as a means for performing such functions. Download logic 416 and reboot logic 418 may comprise a local portion of network management system 122 (FIG. 1) or 222 (FIG. 2).

Each of the other nodes 104-110 of exemplary data communication network 100 (FIG. 1) and the other nodes 204-210 of exemplary data communication network 200 (FIG. 2) may have a structure similar to that described above with regard to exemplary node 400 (FIG. 4). However, the download logic and reboot logic (not shown) of such other nodes contributes to the functions of such other nodes that are described below with regard to FIG. 5.

Figure 5:
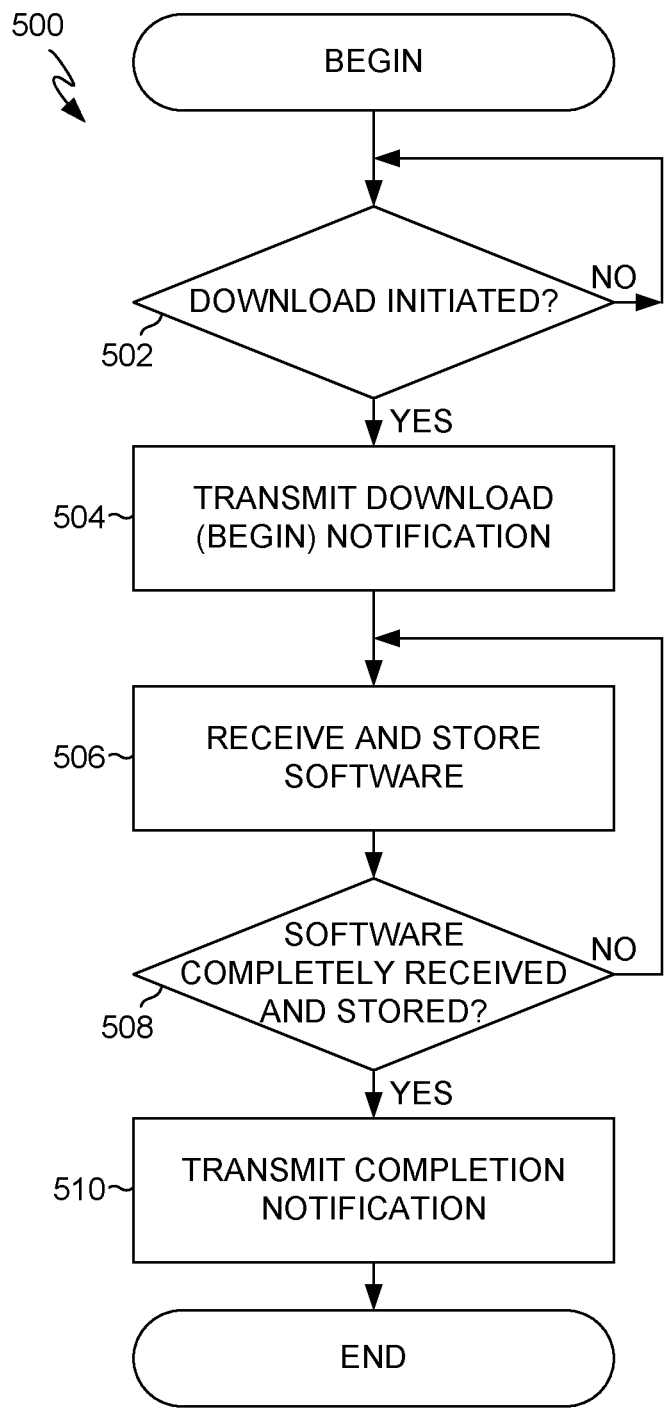
FIG. 5 is a flow diagram illustrating another exemplary method relating to providing a software upgrade in a data communication network, in accordance with an exemplary embodiment of the invention.

As illustrated in FIG. 5, an exemplary method 500 for providing a network software upgrade may be controlled by a device such as, for example, any of above-described nodes 104-110 (FIG. 1) or 204-210 (FIG. 2). As indicated by block 502, the node determines whether a download has begun. That is, the node determines whether it has begun receiving the software unit. As indicated by block 504, if the node determines that it has begun receiving the software unit, the node transmits the above-described download notification. As indicated by block 506, the node stores portions of the software unit as they are received. The node may store the software unit in a memory similar to above-described memory 406 (FIG. 4). Stored in such a manner, the software unit may configure the node with logic similar to above-described node logic 414 (FIG. 4). As indicated by block 508, the node determines whether it has received and stored the entire or complete software unit. As indicated by block 510, if the node determines that it has completed receiving and storing the software unit, the node transmits the above-described completion notification. The node is then rebooted as described above with regard to FIGS. 3A-3B.

One or more illustrative or exemplary embodiments of the invention have been described above. However, it is to be understood that the invention is defined by the appended claims and is not limited to the specific embodiments described.

What is claimed is:

1. A method for providing a network software upgrade, comprising:
    transferring, by a first node, a software unit to a plurality of other nodes in a data communication network, the plurality of other nodes including a downstream-most node from the first node;
    monitoring, by the first node, for receipt of a completion notification from one of the other nodes, the completion notification indicating completion of storage of the software unit by the one of the other nodes; and
    transmitting, by the first node, a reboot command to the plurality of other nodes in response to receipt of the completion notification from each of the other nodes, the first node deferring transmitting the reboot command to any of the other nodes until the first node has received the completion notification from each of the other nodes, the first node transmitting the reboot command to each node of the plurality of other nodes in a downstream-to-upstream sequence beginning with the downstream-most node from the first node, the first node deferring transmitting the reboot command to another node until the first node determines all nodes downstream of the another node have completed rebooting.

2. The method of claim 1, further comprising receiving, by the first node, a download notification from one of the other nodes, the download notification indicating the one of the other nodes has begun receiving the software unit.

3. The method of claim 1, wherein transmitting, by the first node, the reboot command to the plurality of other nodes comprises the first node deferring transmitting the reboot command to a second node until the first node has received the completion notification from the second node and all nodes downstream of the second node.

4. The method of claim 3, wherein transmitting, by the first node, the reboot command to the plurality of other nodes comprises
    rebooting the first node after all other nodes have completed rebooting.

5. The method of claim 1, wherein:
    the data communication network is a wide-area broadband services network; and
    the first node is a central office terminal.

6. A system for providing a network software upgrade, comprising:
    a network interface configured to communicate data with a plurality of other nodes in a data communication network, the plurality of other nodes including a downstream-most node from the first node; and
    a processing system comprising a processor and a memory, the processing system configured to:
    transfer a software unit to the plurality of other nodes in a data communication network;
    monitor for receipt of a completion notification from one of the other nodes, the completion notification indicating completion of storage of the software unit by the one of the other nodes; and
    transmit a reboot command to the plurality of other nodes in response to receipt of the completion notification from each of the other nodes, the reboot command not being transmitted to any of the other nodes until the first node has received the completion notification from each of the other nodes, the first node transmitting the reboot command to each node of the plurality of other nodes in a downstream-to-upstream sequence beginning with the downstream-most node from the first node, the first node deferring transmitting the reboot command to another node until the first node determines all nodes downstream of the another node have completed rebooting.

7. The system of claim 6, wherein the processing system is further configured to receive a download notification from one of the other nodes, the download notification indicating the one of the other nodes has begun receiving the software unit.

8. The system of claim 6, wherein the processing system is configured to transmit the reboot command to the plurality of other nodes by being configured to defer transmitting the reboot command to a second node until the completion notification has been received from the second node and all nodes downstream of the second node.

9. The system of claim 8, wherein the processing system is configured to transmit the reboot command to the plurality of other nodes by being configured to
    reboot the system after all other nodes have completed rebooting.

10. A computer program product for providing a network software upgrade, the computer program product comprising a non-transitory computer-readable medium having stored thereon computer-executable instructions that when executed by a processing system of a node of a data communication network having a plurality of other nodes configure the node to:
- transfer a software unit to the plurality of other nodes, the plurality of other nodes including a downstream-most node from the first node;
- monitor for receipt of a completion notification from one of the other nodes, the completion notification indicating completion of storage of the software unit by the one of the other nodes; and
- transmit a reboot command to the plurality of other nodes in response to receipt of the completion notification from each of the other nodes, the reboot command not being transmitted to any of the other nodes until the first node has received the completion notification from each of the other nodes, the first node transmitting the reboot command to each node of the plurality of other nodes in a downstream-to-upstream sequence beginning with the downstream-most node from the first node, the first node deferring transmitting the reboot command to another node until the first node determines all nodes downstream of the another node have completed rebooting.

11. The computer program product of claim 10, wherein the instructions when executed by the processing system further configure the node to receive a download notification from one of the other nodes, the download notification indicating the one of the other nodes has begun receiving the software unit.

12. The computer program product of claim 10, wherein the instructions that when executed by the processing system configure the node to transmit the reboot command to the plurality of other nodes configure the node to defer transmitting the reboot command to a second node until the completion notification has been received from the second node and all nodes downstream of the second node.

13. The computer program product of claim 12, wherein the instructions that when executed by the processing system configure the node to transmit the reboot command to the plurality of other nodes configure the node to
reboot the system after all other nodes have completed rebooting.

14. A system for providing a network software upgrade in a data communication network, comprising:
- a first node of a plurality of nodes of the data communication network, the first node having a network interface and a processing system, the network interface of the first node coupled via one or more communication links to others of the plurality of nodes, the plurality of other nodes including a downstream-most node from the first node;
- a second node of the plurality of nodes, the second node having a network interface and a processing system, the network interface of the second node directly connected to the first node by a first communication link, the processing system of the second node configured to download upgrade software from the first node and to transmit a first completion notification to the first node indicating completion of downloading the upgrade software, the processing system of the second node further configured to reboot the second node in response to receiving a reboot command;
- a third node of the plurality of nodes, the third node having a network interface and a processing system, the network interface of the third node directly connected to the second node by a second communication link and not directly connected to the first node by any communication link, the processing system of the third node configured to download the upgrade software from the first node and to transmit a second completion notification to the first node indicating completion of downloading the upgrade software, the processing system of the third node further configured to reboot the third node in response to receiving the reboot command; and
- the processing system of the first node configured to transmit the reboot command to the second node and the third node in response to receiving the first and second completion notifications, the processing system of the first node configured to defer transmitting the reboot command to the second node and the third node until the first node has received both the first and second completion notifications, the processing system of the first node configured to transmit the reboot command to the third node before transmitting the reboot command to the second node, the processing system of the first node configured to defer transmitting the reboot command to the third node until the processing system of the first node determines the third node has completed rebooting.

15. The system of claim 14, wherein the processing system of the first node is configured to reboot the first node after all other nodes of the plurality of nodes have completed rebooting.

* * * * *